United States Patent [19]

Gadkaree et al.

[11] Patent Number: 4,673,658
[45] Date of Patent: Jun. 16, 1987

[54] CORDIERITE CERAMICS CONTAINING SILICON CARBIDE WHISKER REINFORCEMENT

[75] Inventors: Kishor P. Gadkaree, Big Flats; Max R. Montierth, Elmira; Mark P. Taylor, Painted Post, all of N.Y.

[73] Assignee: Corning Glass Works, Corning, N.Y.

[21] Appl. No.: 855,687

[22] Filed: Apr. 25, 1986

[51] Int. Cl.$^4$ .................. C04B 35/56; C04B 35/18; C04B 35/20
[52] U.S. Cl. .................. 501/89; 501/95; 264/60
[58] Field of Search .................. 501/95, 89; 264/60

[56] References Cited

U.S. PATENT DOCUMENTS

| | | | |
|---|---|---|---|
| 3,885,977 | 5/1975 | Lachman et al. | 501/119 |
| 4,251,377 | 2/1981 | Schleinitz | 501/118 |
| 4,279,654 | 7/1981 | Yajima et al. | 501/95 |
| 4,280,845 | 7/1981 | Matsuhisa et al. | 501/119 |
| 4,295,892 | 10/1981 | Matsuhisa et al. | 501/153 |
| 4,511,663 | 4/1985 | Taylor | 501/32 |
| 4,543,345 | 9/1985 | Wei | 501/95 |
| 4,568,402 | 2/1986 | Ogawa et al. | 501/119 |

OTHER PUBLICATIONS

Bender, B. A. et al., "Electron Microscopy of Ceramic Fiber–Ceramic Matrix Composites . . . " *Cer. Eng. Sci. Proc.*, vol. 5 (1984) pp. 513–529.

*Primary Examiner*—Mark L. Bell
*Attorney, Agent, or Firm*—K. van der Sterre

[57] ABSTRACT

Silicon-carbide-whisker-reinforced cordierite ceramic products are prepared by uniformly incorporating the whiskers in the ceramic batch, forming the batch into a product preform, e.g. by extrusion, and firing the preform according to a process wherein the conversion of the oxide batch materials to cordierite occurs under a non-oxidizing atmosphere. Significant improvements in product strength and thermal downshock resistance are obtained.

7 Claims, No Drawings

CORDIERITE CERAMICS CONTAINING SILICON CARBIDE WHISKER REINFORCEMENT

BACKGROUND OF THE INVENTION

The use of inorganic whiskers and fibers to reinforce glasses, glass-ceramics, sintered ceramics, plastics, and metals has long been practiced. Commonly, the term whiskers has been applied to elongated, single-crystal fibers. In general, whiskers have been described as having a thickness less than about 100 microns with a length-to-diameter ratio of at least 100.

Whiskers have found extensive use as reinforcing agents in various matrices because of their inherent shape, high modulus of elasticity, and high tensile strength. To illustrate, when dispersed in a crystalline matrix, whiskers will occupy sites along the grain boundaries of the crystals, and may significantly improve the creep resistance of the material. This may be due, for example, to an increase in the length of shear required and/or the added complexity of shear required to yield apparent creep.

Also, the high elastic modulus and tensile strength of many different whiskers enables them to produce composite products demonstrating superior strength-to-weight and stiffness-to-weight properties. For example, whiskers prepared from very stiff, low density covalent compounds such as carbides, nitrides, and oxides can exhibit elastic moduli higher than most metals, and are often many times stronger than steel when considered in proportion to their weight.

In contrast to whiskers, fibers are generally deemed to be multicrystalline or amorphous. Extensive study to understand the basic means underlying the strengthening improvement to composite bodies imparted by fibers has indicated the mechanism to be that of load transfer by the matrix to the fibers through shear. This load transfer shifts stress to the relatively long, high modulus fibers, and the fibers may additionally act to impede crack propagation in the matrix.

The basic strengthening mechanism is believed to be the same in whisker-containing composites, but the amount of load transferred by the matrix to the whiskers is dependent upon the length and aspect ratio of the whisker. Hence, shorter whiskers may not be loaded to the breaking stress and, consequently, full advantage cannot be taken to their reinforcing capabilities.

In addition to the length and aspect ratio of the whisker, orientation of the whisker with respect to the applied stress and the stress concentrations at the ends of the whisker result in lower strength than would be possible with fibers. Accordingly, whisker reinforced composites will typically manifest less desirable mechanical properties than unidirectionally-oriented, continuous fiber composites fabricated from like constituents (when properties are measured along the fiber axis). Whisker-containing composites possess an advantage, however, over the continuous fiber-containing composites in that they are nearly macroscopically isotropic.

SiC fibers and whiskers have been demonstrated as reinforcing agents in numerous metal and non-metal matrices. For example, U.S. Pat. No. 4,324,843 records the formation of SiC fiber reinforced glass-ceramic composite bodies wherein the glass-ceramic matrix is selected from the composition systems of aluminosilicate, lithium aluminosilicate, magnesium aluminosilicate, and combinations thereof. U.S. Pat. No. 4,464,475 discloses the production of SiC fiber reinforced glass-ceramic composite bodies wherein barium osumilite constitutes the predominant crystal phase. U.S. Pat. No. 4,464,192 describes the preparation of SiC whisker reinforced glass and glass-ceramic composite bodies wherein the glass-ceramic matrix is selected from the group of lithium aluminosilicate, magnesium aluminosilicate, aluminosilicate, and combinations thereof.

The above matrices are asserted to be suitable for use temperatures up to about 1300° C. Above that temperature range those compositions are not refractory enough to provide a viscosity sufficiently high to transfer load to reinforcing fibers and whiskers. Consequently, the matrix deforms excessively and the composite suffers loss of load-bearing ability.

In the field of fiber reinforced glass composites, U.S. Pat. No. 4,464,192 discloses the preparation of reinforced composite articles consisting of whiskers or chopped fibers embedded in a glass matrix. The patent describes in some detail the production, through injection molding, of composite articles consisting of chopped fibers (about 0.75" in length with an average diameter of ±5–50 microns) of alumina, graphite, silicon carbide, and/or silicon nitride dispersed within a matrix of a high silica glass, a borosilicate glass, or an aluminosilicate glass. U.S. Pat. No. 4,314,852 discloses the fabrication of reinforced composite articles consisting of continuous SiC fibers embedded in a glass matrix, the glass again being selected from the group of high silica glass, borosilicate glass, and aluminosilicate glass.

The mechanisms of toughening in wholly ceramic matrices, i.e. ceramic matrices without substantial glassy phases, have been reviewed by R. W. Rice in "Mechanisms of Toughening in Ceramic Composites", *Ceram. Eng. Sci. Proc.*, 2(7–8) 661–701 (1981). Major strengthening mechanisms for fibers in these ceramics include load transfer, prestressing, crack impediment, crack deflection, and fiber pullout. Also noted, however, is the fact that second phases incorporated in composites for purposes of reinforcement provide many potential sources and preferred paths for localized stresses and crack growth. Thus some composites may have significantly lower compressive strengths than the pure ceramic matrix itself, or may suffer damage under compressive loading which leads to reductions in tensile strength.

Chemical compatibility between the ceramic matrix and the reinforcing phases is of course a fundamental requirement of any composite ceramic system. U.S. Pat. No. 4,485,179 discloses that silicon carbide fibers, in particular, exhibit high reactivity toward certain glass-ceramic matrix materials. That patent describes a chemical modification of the matrix phase which was used to moderate this activity. As this patent suggests, compatibility is required not only under the conditions of use, but also under the conditions encountered in the course of composite fabrication. For example, silicon carbide has been shown to promote foaming in certain ceramic batches for cordierite products, as shown in U.S. Pat. No. 4,297,140.

Cordierite is a crystalline magnesium aluminum metasilicate material ($2MgO.2Al_2O_3.5SiO_2$) known to exhibit a low coefficient of thermal expansion over a rather wide temperature range. Major proportions of this phase in a ceramic body therefore impart excellent thermal shock resistance to the body.

By virtue of this excellent thermal shock resistance and refractoriness, extruded monolithic ceramic honeycomb structures comprising cordierite or substituted cordierite as the principal crystalline phase have found widespread use as catalyst supports and filters in the treatment of combustion exhaust gases produced by motor vehicles and woodstoves. U.S. Pat. No. 3,885,977 describes the manufacture of such bodies from extrudable batch mixtures of clay, talc and alumina, these components reacting to form cordierite as the extruded body is fired after forming.

While cordierite products such as described in this patent have exhibited adequate strength and thermal shock resistance for many applications, certain applications such as use in motor vehicles involve repeated and extensive physical and thermal shocks. Thus careful packaging is required to minimize the incidence of product breakage. For these applications, particularly, improvements in strength and/or thermal shock resistance in the monolithic cordierite structure would be beneficial.

Accordingly, it is a principal object of the present invention to provide a reinforced cordierite ceramic body offering improved strength and/or thermal shock resistance.

It is a further object of the invention to provide a method for providing reinforced cordierite ceramics from clay-containing batch materials.

Other objects of the invention will become apparent from the following description thereof.

SUMMARY OF THE INVENTION

The present invention provides a whisker-reinforced cordierite ceramic body exhibiting improved strength and thermal shock resistance, and a method for making it. Cordierite ceramics provided in accordance with the invention may be made by conventional extrusion or other forming processes, so that ceramic products in any of the configurations presently utilized, but exhibiting improved physical and thermal properties, may be provided.

Whisker-reinforced ceramic bodies provided in accordance with the invention are polycrystalline cordierite ceramics, comprising about 60-95% by weight of oxide crystal phases wherein the predominant phase (at least about 50% by volume) is cordierite. The bodies further comprise a reinforcing silicon carbide whisker phase, this phase constituting about 5-40% by weight of the body.

The manufacture of a whisker-reinforced cordierite ceramic in accordance with the invention requires the use of a controlled firing procedure wherein the necessary cordierite crystal phase can be developed from the selected raw ceramic batch materials without destruction of the reinforcing silicon carbide whisker phase. A ceramic batch is first compounded from conventional raw materials comprising source materials for MgO, $Al_2O_3$, $SiO_2$ and, optionally, selected other oxides, with whiskers of silicon carbide being homogeneously dispersed therein. The batch is compounded in proportions which will yield, after firing, a mixed oxide-carbide composition consisting essentially, in weight percent, of about 5-40% SiC, 25-54% $SiO_2$, 18-48% $Al_2O_3$, and 5-19% of MgO or an equivalent oxide, as hereinafter described.

The compounded batch comprising homogeneously dispersed silicon carbide whiskers is next shaped into a product preform by a suitable ceramic forming process such as extrusion, dry pressing, slip casting or hot pressing. In a preferred embodiment, the batch is blended with a suitable vehicle to form a plasticized mixture, and this mixture is formed into a product preform by extrusion and drying.

The resulting preform is next fired to remove adsorbed moisture and any fugitive vehicle constituents therefrom. This firing is carried out under oxidizing conditions at temperatures sufficient to oxidize any organic species present in the body but insufficient to initiate conversion of the raw batch materials to cordierite.

Finally the preform is further fired in a non-oxidizing atmosphere to a temperature sufficient to convert the magnesium, aluminum and silicon source materials therein to crystalline cordierite. It is found that this final firing, if carried out in a neutral atmosphere such as nitrogen, which is neither oxidizing nor reducing, can result in the development of a highly crystalline cordierite body without objectionable damage to the reinforcing silicon carbide whiskers. Thus no significant harmful interactions between the raw batch materials and the silicon carbide whiskers, or interference with the reaction paths by which cordierite phases are developed from these batch materials, are observed.

DETAILED DESCRIPTION

Raw materials for ceramic batches useful in the production of reinforced cordierite ceramics provided in accordance with the invention may be selected from any suitable source. High-purity clay, talc, silica, alumina, aluminum hydroxides and magnesia (MgO)-yielding raw materials are conventionally used for such ceramics and are satisfactory here. However, as is well known, the thermal expansion and refractoriness of cordierite products are adversely affected by the presence of impurities such as calcia (CaO) and the alkalis such as soda and potash. Thus where optimum refractoriness and thermal shock resistance are required in the product, batch raw materials substantially free of Ca, Na and K will be utilized.

The preferred batch materials in commercial use for the production of very low expansion extruded cordierite ceramic bodies are clay, talc, and alumina, with the clays typically constituting kaolinitic clays of a platey rather than stacked habit. Platey kaolins can be produced by the preprocessing of stacked kaolinite clays, or the raw material batch including the clay can be processed in a way which breaks down the crystal stacks into platelets.

The introduction of silicon carbide whiskers into the raw material batch is complicated by morphology of the whiskers. Commercially available forms of these whiskers are high-aspect-ratio crystalline fibers of very small cross-section, e.g. typically less than 100 microns in diameter with length-to-diameter aspect ratios of at least 5:1. As received from commercial suppliers these whiskers are generally in agglomerated form, and direct addition of the whisker agglomerates into a ceramic body can result in improper consolidation and weak spots in the composite.

Proper incorporation of SiC whiskers in the ceramic batch requires that fiber agglomerates the broken up and the whiskers completely and uniformly dispersed therein. A useful technique for accomplishing this result is to first disperse the whiskers in a suitable liquid such as water, using ball-milling or a shear mixer to form a whisker slurry. Ceramic batch materials such as clay, talc and alumina can then be added to the whisker slurry with shear mixing to achieve uniform wetting and dispersion of these materials.

The resulting slurry, comprising SiC whiskers together with ceramic batch materials in quantities yielding the proportions of MgO, $Al_2O_3$ and $SiO_2$ required for cordierite formation in the final product, is preferably next dried to provide a dry batch mixture containing the homogeneously dispersed SiC whiskers. Spray drying constitutes a suitable technique for drying the slurry while retaining uniform whisker distribution in the batch.

The forming of the dry batch into a preform or green body suitable for conversion to cordierite by firing can be accomplished by any one of a number of known techniques. Depending on the porosity desired in the cordierite product the bath may be mixed with suitable binders and simply pressed into the shape of a preform, or it may be formed by a hot pressing method.

For the commercial manufacture of flat or thin-walled cordierite ceramic products such as ceramic honeycombs, the preferred forming technique is extrusion. A batch mixture suitable for extrusion can be prepared from the dry, whisker-containing batch by mixing the batch with a suitable liquid vehicle. The vehicle may comprise water and extrusion aids necessary to give the batch plastic formability and sufficient green strength after forming to resist breakage prior to firing. Alternatively, extrusion aids may be mixed with the ceramic batch materials prior to incorporating them into the whisker slurry.

The extrusion aids will normally comprise both binders and plasticizers; methyl cellulose and alkali stearates are examples of some of the extrusion aids which have been used. Batches of this type, which generally contain 25-35% water, are sufficiently plastic so that they can readily be formed by extrusion into preforms comprising very thin wall dimensions, i.e. less than 1 mm. The plasticized batches can also be formed conveniently by rolling or pressing, the rolled or pressed components then being either used directly or assembled into more complex shapes prior to firing.

As is also known, for example, from U.S. Pat. No. 4,329,162, it is possible to control the porosity of the fired product to achieve either high or low porosity by including agents such as graphite in the batch which burn out to yield voids on firing. Such additions may also be used in the present process provided they do not interact adversely with the silicon carbide whisker phase.

The firing procedure used to convert the SiC whisker-containing green ceramic body to a cordierite-containing ceramic product critically affects the properties of the resulting ceramic. Conventional firing processes for cordierite ceramics comprise firing the green body in air to temperatures in the range of about 1340°-1450° C., with a soak time in that temperature rage of a duration sufficient to complete the crystallization of the body. Such processing cannot be used to fire products containing SiC whiskers, since a strong interaction between the whiskers and one or more of the batch materials during the firing process results in a weak and/or deformed product.

In accordance with the method of the present invention, a desirable whisker-reinforced product is obtained in a two-phase process wherein the green ceramic body is fired in air only to a temperature at which burnout of any organics present in the body and removal of adsorbed water can be completed. This will typically require heating to temperatures in the range of about 800°-900° C.

After this initial heating phase, the green body is further heated in a non-oxidizing atmosphere, after cooling and inspection if desired, to a final temperature sufficient to obtain complete crystallization of the body. Temperatures in the range of about 1340°-1450° C. are generally suitable for this purpose.

The preferred non-oxidizing atmosphere for use in firing clay-containing bodies in accordance with the present method is one consisting predominantly or entirely of nitrogen. Other inert gases, such as helium and/or argon, give inferior properties when used alone, suggesting either damage to the carbide whisker phase or poor sintering and conversion of the body to cordierite.

The invention may be further understood by reference to the following detailed Example, which is intended to be merely illustrative of the presently preferred method for carrying out the invention.

EXAMPLE

A ceramic batch suitable for the production of a cordierite-containing ceramic is prepared. The batch has the following composition, in parts by weight:

| RAW MATERIAL | PARTS BY WEIGHT |
|---|---|
| Georgia Kaolin Hydrite MP clay | 19.30 |
| Georgia Kaolin Glomax LL clay | 16.36 |
| Pfizer MP 96-28 talc | 30.85 |
| Alcan 6701 alumina | 10.46 |
| Asbury 4012 graphite | 23.03 |
| Methyl cellulose plasticizer/binder | 4.0 |
| Alkali stearate extrusion aid | 0.5 | and is thoroughly blended to form a homogeneous batch.

The resulting dry mixture is slowly added with high-speed blending to a water slurry containing 1-2% by weight of SiC whiskers. The whiskers are commercially available from the Arco Chemical Co., and have typical dimensions of about 10-30 microns length and 1-3 microns diameter. The whisker slurry is blended at high speed for about 10 minutes prior to the addition of the ceramic batch to insure complete dispersion of any whisker agglomerations.

The premixed ceramic batch material is added to the whisker slurry in a quantity sufficient to achieve the required oxide content. The proportions of SiC and ceramic batch precursors for MgO, $Al_2O_3$ and $SiO_2$ are such that a SiC concentration of 15% of the cordierite product will result. High-speed blending of the whisker-batch slurry is continued until thorough wetting and homogeneous dispersion of all batch materials is achieved. The resulting slurry is then spray-dried to a whisker-containing powder batch material.

An extrusion batch is next prepared from the dried batch material by adding water to the dry batch in a Littleford mixer. Water is added to a level of about 34% of total batch weight, and mixing is continued for 5 minutes to achieve batch uniformity. The mixed batch is next extruded at about 600 psi to form extruded rods of circular cross-section and approximately 0.8 cm diameter.

The green ceramic extruded rods thus provided are next dried and fired to convert them to cordierite ceramics. The rods are first fired through a burnout schedule wherein they are fired in air from room temperature to 850° C. over a time period of about 40 hours, and thereafter cooled to room temperature for inspection. Thereafter the rods are fired to 1400° C. in a nitrogen atmosphere over a heating interval of about 20 hours, and soaked at 1400° C. for 10 hours, followed by cooling to room temperature at the furnace cooling rate of about 200° C./hour.

The resulting whisker-reinforced rods, containing about 15% (weight) of SiC whiskers and the remainder crystalline cordierite, are evaluated for physical properties along with standard cordierite rods having the same oxide composition but not including the reinforcing SiC whisker addition. Some of the standard rods are fired in air to 1400° C. without cooling for inspection, in the manner of conventional cordierite products. The remaining standard rods are processed according to the two-phase firing described above for the SiC-reinforced products, with the second stage being carried out under nitrogen. In all cases, complete conversion of the oxide materials to cordierite is obtained.

Table I below reports the results of an evaluation of each of these three groups of rods. Included in Table I for each group are an average modulus of rupture strength (MOR), in psi, an average coefficient of thermal expansion value (CTE), in $°C.^{-1}$ as determined by measurement over the range 25°–900° C., and an elastic modulus value (E), in psi. Also reported for each group are average porosity values for the fired material, and a thermal shock parameter (TSP) indicating the relative resistance to breakage, in thermal downshock, for each sample. The value of the thermal shock parameter is calculated for a given material from the modulus of rupture strength, elastic modulus, and coefficient of thermal expansion of the material according to the formula:

$$TSP = \frac{MOR}{(E)(CTE)}.$$

For the purposes of reporting in Table I, the SiC whisker-reinforced rods are identified as Product type A, while the whisker-free nitrogen-fired rods are identified as Type B and the whisker-free air-fired rods are referred to as Type C.

TABLE I

| | Physical Properties of Cordierite Products | | | | |
|---|---|---|---|---|---|
| Product Type | MOR (psi) | CTE (°C.$^{-1}$) | E (psi) | TSP | Porosity |
| A | 11,700 | 3.09 × 10$^{-6}$ | 3.36 × 10$^6$ | 1128 | 7% |
| B | 1,550 | 1.84 × 10$^{-6}$ | 2.45 × 10$^6$ | 342 | 56% |
| C | 2,050 | 1.50 × 10$^{-6}$ | 2.31 × 10$^6$ | 573 | 56% |

As indicated from the foregoing data, whereas the Type A products do exhibit somewhat higher thermal expansion characteristics than the whisker-free products, due to the incorporation of SiC whiskers therein which are relatively high in thermal expansion, the Type A products nevertheless exhibit significantly better thermal shock resistance than either of the whisker-free products. This result is largely due to the very high strength of the whisker-reinforced products, which exhibit an approximately 5-fold increase in strength when compared to either of the cordierite products prepared without SiC whiskers.

A drop in porosity in the whisker-reinforced products is noted, but this variable depends not only on the use of porosity control agents but also on the whisker content of the batch and the firing schedule, and can be adjusted within broad limits without requiring extreme changes in product composition. In general such porosity changes do not substantially affect either the thermal expansion of the body or the strength/elastic modulus ratio of the material. Therefore, the thermal shock parameter reported in Table I is considered to accurately reflect the strengthening effect of whiskers in the material, and the increase in strength is greater than can be accounted for by reduced porosity.

The preferred products provided in accordance with the invention will contain 10–20% by weight of SiC whiskers, with cordierite constituting the remaining 80–90% by weight thereof. Thus the product will have an overall composition consisting essentially of 10–20% SiC, 9–15% MgO, 26–37% Al$_2$O$_3$, and 37–48% SiO$_2$. Within this composition range, a whisker-reinforced cordierite ceramic material having a modulus of rupture strength in excess of 5,000 psi is considered to be routinely obtainable.

While the above illustrative example describes the production of cordierite ceramics wherein substantially all of the oxide constituents are converted to cordierite crystals, other crystalline phases are expected to be compatible with the whiskers and primary cordierite phase such that their presence in the product is not likely to be detrimental to the properties thereof or require significantly different processing. Examples of additional crystal phases which may optionally be present in products comprising cordierite as the predominant (greater than 50% by volume) crystal phase are mullite (3Al$_2$O$_3$.2SiO$_2$) and sapphirine (Mg$_4$Al$_{10}$Si$_2$O$_{23}$).

Similarly, the inclusion of oxides other than MgO, Al$_2$O$_3$ and SiO$_2$ in the ceramic batch composition is permissible provided such additions are compatible with the requirement that cordierite constitute the predominant crystal phase. As is well known, a number of bivalent metal cations can replace magnesium in the cordierite crystal without unduly modifying the crystalline structure thereof. Such cations include Mn, Ni, Fe and Co. Thus whisker reinforced ceramics provided in accordance with the invention may include, in partial substitution for MgO on a mole-for-mole basis in amounts up to the indicated mole fraction of total MgO content, up to about 0.98 MnO, up to about 0.25 NiO, up to about 0.15 CoO, and up to about 0.40 FeO. The total content of MnO+NiO+CoO+FeO will not exceed the mole fraction of 0.98 of the total RO content (MgO plus other oxides), the remainder being MgO. Thus the term cordierite as used in the present specification and claims refers not only to common or magnesium cordierite, but also to substituted cordierites such as manganese cordierite and the like which are well known structural analogs of the common cordierite crystal.

We claim:
1. A whisker-reinforced polycrystalline cordierite ceramic product having:
(a) an oxide crystal phase constituting 60–95% by weight of the product and consisting at least predominantly of cordierite;
(b) a silicon carbide whisker phase constituting 5–40% by weight of the product, the silicon carbide whiskers having a diameter not exceeding about 3 microns and a length not exceeding about 30 microns;

(c) a composition consisting essentially, in weight percent, of about 5-40% SiC, 25-54% $SiO_2$, 18-48% $Al_2O_3$, and 5-19% RO, wherein RO consists essentially of MgO and, optionally, one or more oxides in partial substitution for MgO selected in proportions up to the indicated mole fraction of total RO content from the group consisting of: up to 0.98 MnO, up to 0.25 NiO, up to CoO, and up to 0.40 FeO, but not exceeding 0.98 total of MnO+NiO+CoO+FeO; and (d) a modulus of rupture strength in excess of 5,000 psi.

2. A whisker-reinforced ceramic product in accordance with claim 1 which consists essentially, in weight percent, of about 10-20% SiC whiskers, 9-15% MgO 26-37% $Al_2O_3$, and 37-48% $SiO_2$.

3. A method of making a whisker-reinforced cordierite ceramic product which comprises the steps of:
(a) compounding a ceramic batch comprising silicon carbide whiskers together with source materials for the oxides $SiO_2$, $Al_2O_3$, and RO, wherein RO is MgO and, optionally, one or more of MnO, CoO, FeO and NiO, said batch being compounded in proportions effective to yield, after firing, an oxide-carbide composition consisting essentially, in weight percent, of about 5-40% SiC, 25-54% $SiO_2$, 18-48% $Al_2O_3$, and 5-19% RO, wherein RO consists essentially of MgO and, optionally, one or more oxides in partial replacement of MgO selected in proportions up to the indicated mole fraction of total RO content from the group consisting of: up to 0.98 MnO, up to 0.25 NiO, up to 0.15 CoO, and up to 0.40 FeO, but not exceeding 0.98 total of MnO+NiO+CoO+FeO:
(b) forming the ceramic batch into a preform for the ceramic product;
(c) firing the preform to a temperature at least sufficient to initiate conversion of the source materials for oxides into a cordierite crystal phase and maintaining the preform at said temperature for a time sufficient to complete the formation of cordierite, while providing a non-oxidizing firing atmosphere around the preform during exposure thereof to firing temperatures in excess of about 900° C.

4. A method in accordance with claim 3 wherein the step of compounding the ceramic batch comprises the steps of:
(a) dispersing silicon carbide whiskers in an aqueous slurry;
(b) adding the source materials for oxides to the slurry and uniformly dispersing said materials therein, and
(c) drying the slurry to provide a ceramic batch containing a uniform dispersion of silicon carbide whiskers therein.

5. A method in accordance with claim 3 wherein the step of forming the ceramic batch into a preform for the ceramic product comprises the steps of:
(a) mixing the ceramic batch with an aqueous vehicle to form an extrudable mixture; and
(b) extruding the mixture to provide the preform for the ceramic product.

6. A method in accordance with claim 5 wherein the step of firing the preform comprises the steps of:
(a) firing the preform in an oxidizing atmosphere to a temperature sufficient to oxidize vehicle constituents present therein but insufficient to cause the loss of the SiC whiskers by oxidation; and
(b) thereafter firing the preform in a non-oxidizing atmosphere to a temperature and for a time sufficient to develop a crystal phase consisting at least predominantly of cordierite therein.

7. A method in accordance with claim 6 wherein the oxidizing atmosphere is air and the non-oxidizing atmosphere is 100% nitrogen.

* * * * *

UNITED STATES PATENT AND TRADEMARK OFFICE
CERTIFICATE OF CORRECTION

PATENT NO. : 4,673,658
DATED : June 16, 1987
INVENTOR(S) : Kishor P. Gadkaree et al.

It is certified that error appears in the above-identified patent and that said Letters Patent is hereby corrected as shown below:

Column 2, line 49, "phases" should read --phase--.

Column 4, line 63, "the" should read --be--.

Column 5, line 17, "bath" should read --batch--.

Column 5, line 57, "rage" should read --range--.

Column 7, line 41, "type" should read --Type--.

Column 9, line 8, "up to CoO," should read --up to 0.15 CoO,--.

Signed and Sealed this

Fifth Day of January, 1988

Attest:

DONALD J. QUIGG

Attesting Officer     *Commissioner of Patents and Trademarks*